US012741343B2

(12) United States Patent
Iguchi et al.

(10) Patent No.: US 12,741,343 B2
(45) Date of Patent: Sep. 22, 2026

(54) SOLDER AND ELECTRONIC COMPONENT

(71) Applicant: TDK CORPORATION, Tokyo (JP)

(72) Inventors: Toshihiro Iguchi, Tokyo (JP); Norihisa Ando, Tokyo (JP)

(73) Assignee: TDK CORPORATION, Tokyo (JP)

( * ) Notice: Subject to any disclaimer, the term of this patent is extended or adjusted under 35 U.S.C. 154(b) by 488 days.

(21) Appl. No.: 18/162,835

(22) Filed: Feb. 1, 2023

(65) Prior Publication Data

US 2023/0302583 A1 Sep. 28, 2023

(30) Foreign Application Priority Data

Mar. 28, 2022 (JP) ................................ 2022-051530

(51) Int. Cl.

*B23K 35/26* (2006.01)
*B23K 35/02* (2006.01)
*B23K 35/36* (2006.01)
*B23K 101/36* (2006.01)
*B23K 103/22* (2006.01)

(52) U.S. Cl.

CPC ........ *B23K 35/262* (2013.01); *B23K 35/0244* (2013.01); *B23K 35/3601* (2013.01); *B23K 2101/36* (2018.08); *B23K 2103/22* (2018.08)

(58) Field of Classification Search

CPC .............. B23K 35/262; B23K 35/0244; B23K 35/3601

See application file for complete search history.

(56) References Cited

U.S. PATENT DOCUMENTS 5,127,969 A * 7/1992 Sekhar ............... B23K 35/0222 148/23
2003/0141592 A1* 7/2003 Ma ........................ H01L 23/293 257/E21.503
2020/0238443 A1* 7/2020 Sohn ................... B23K 35/302

FOREIGN PATENT DOCUMENTS

CN 101323062 A 12/2008
CN 113004057 A * 6/2021 ............. C04B 41/90
CN 115383343 A * 11/2022 ......... B23K 35/0222
JP 2000-182888 A 6/2000
JP 2003-297873 A 10/2003
JP 2005-288526 A 10/2005
JP 2008300455 A * 12/2008

OTHER PUBLICATIONS

The Engineering ToolBox (2003). Linear Thermal Expansion Coefficients of Materials. [online] Available at: https://www.engineeringtoolbox.com/linear-expansion-coefficients-d_95.html (Year: 2003).*
Alumina. Table 3.1. Data for Young's Modulus, E. Engineering Materials 1—An Introduction to Properties, Applications and Design (5th Edition). Elsevier. (Year: 2019).*
Zinkle, S.J. and LL. Snead. Thermophysical and Mechanical Properties of SiC/SiC Composites. p. 1. (Year: 1998).*
CN 113004057 A machine translation of the description (Year: 2021).*
CN 115383343 A machine translation of the description (Year: 2022).*
Japan Industrial Standards (JIS) Research Council JISZ3282:2017 Solder—Chemical Composition and Shape (Year: 2017).*
JP 2008-300455 A machine translation of the description (Year: 2008).*
Li, M., Zhang, L., Jiang, N., Zhang, L., Zhong, S. Materials modification of the lead-free solders incorporated with micro/nano-sized particles: A review. Materials and Design 197 109224, 34 pages. https://doi.org/10.1016/j.matdes.2020.109224 (Year: 2021).*

* cited by examiner

*Primary Examiner* — Tima M. Mcguthry-Banks
(74) *Attorney, Agent, or Firm* — Oliff PLC

(57) ABSTRACT

A solder includes a Sn alloy phase and a particle. The particle has a higher Young's modulus than the Sn alloy phase. The particle has a lower linear expansion coefficient than the Sn alloy phase. An electronic component includes a metal terminal joined thereto with the solder.

8 Claims, No Drawings

SOLDER AND ELECTRONIC COMPONENT

TECHNICAL FIELD

The present invention relates to solder and an electronic component.

BACKGROUND

Examples of methods of mounting an electronic component (e.g., a multilayer ceramic capacitor) on a substrate using solder include a method of surface-mounting the electronic component on the substrate through reflow soldering and a method of soldering mounting metal terminals to terminal electrodes of the multilayer ceramic capacitor as shown in Patent Document 1 to mount the electronic component on the substrate. Solder is used in both methods. The latter is particularly advantageous in terms of readily preventing noise from the substrate caused by vibrations of the multilayer ceramic capacitor.

Normally, the linear expansion coefficient of solder is higher than that of a material to be joined. This is because solder has a lower melting point than the material to be joined and because there is a general tendency for a material with a lower melting point to have a higher linear expansion coefficient.

When solder has a linear expansion coefficient that is between different linear expansion coefficients of two different materials joined using the solder, thermal stress caused by thermal shock is particularly mitigated. Because solder generally has a high linear expansion coefficient, a method of reducing the linear expansion coefficient of solder has been in demand so that the linear expansion coefficient falls between the linear expansion coefficients of the two materials.

Unfortunately, changing the composition of an alloy of solder to reduce its linear expansion coefficient may significantly change its characteristics. For example, the solder may have a higher melting point.

Thus, a method of reducing the linear expansion coefficient of solder without the composition of the alloy being significantly changed is in demand.

Patent Document 1: JP Patent Application Laid Open No. 2000-182888

SUMMARY

It is an object of the present invention to provide solder having a low linear expansion coefficient without the composition of an alloy of the solder being significantly changed.

To achieve the above object, solder according to the present invention includes a Sn alloy phase and a particle, wherein the particle has a higher Young's modulus than the Sn alloy phase; and the particle has a lower linear expansion coefficient than the Sn alloy phase.

The particle may contain at least one selected from the group consisting of C, N, and O.

The particle may contain C.

The particle may contain SiC as a main component.

The particle may occupy 15 vol % or more and 40 vol % or less.

The particle may have a linear expansion coefficient of 10 ppm/° C. or less.

The particle may have a Young's modulus of 60 GPa or more.

The solder may substantially not contain Pb.

An electronic component according to the present invention includes a metal terminal joined thereto with the solder.

DETAILED DESCRIPTION

Hereinafter, an embodiment of the present invention will be explained.

Solder according to the present embodiment includes a Sn alloy phase and particles. The particles have a higher Young's modulus and a lower linear expansion coefficient than the Sn alloy phase.

The solder according to the present embodiment has a lower linear expansion coefficient than solder that is composed of only a Sn alloy phase and does not include particles. Consequently, the solder according to the present embodiment can have a linear expansion coefficient close to that of a material to be soldered, without the composition of the Sn alloy phase being significantly changed. In particular, the solder according to the present embodiment can have a linear expansion coefficient that is between the linear expansion coefficient of a commonly used metal terminal and the linear expansion coefficient of a commonly used electronic component.

In the case where the Young's modulus of the particles is not higher than that of the Sn alloy phase, the linear expansion coefficient of the solder including the Sn alloy phase and the particles does not readily change even when the particles have a lower linear expansion coefficient than the Sn alloy phase. This is because the particles with a low Young's modulus are distorted in response to change of the shape of the solder in use.

The Young's modulus of the particles is not limited to particular values. For example, the Young's modulus of the particles may be 60 GPa or more. The particles may have a Young's modulus of preferably 100 GPa or more and more preferably 300 GPa or more. The linear expansion coefficient of the particles is not limited to particular values. For example, the linear expansion coefficient of the particles may be 10.0 ppm/° C. or less and preferably 7.0 ppm/° C. or less.

When different types of particles with different Young's moduli are included, a weighted average of the Young's moduli of the particles calculated in accordance with their volume ratios may be regarded as the above-mentioned Young's modulus of the particles.

When different types of particles with different linear expansion coefficients are included, a weighted average of the linear expansion coefficients of the particles calculated in accordance with their volume ratios may be regarded as the above-mentioned linear expansion coefficient of the particles.

The Young's modulus, Poisson's ratio, and linear expansion coefficient of the Sn alloy phase in the solder may be measured by any method. For example, the Young's modulus, Poisson's ratio, and linear expansion coefficient of an alloy having the same composition as the Sn alloy phase in the solder are measured by a known method.

The Young's modulus, Poisson's ratio, and linear expansion coefficient of the particles in the solder may be measured by any method. Hereinafter, a method of measuring the Young's modulus, Poisson's ratio, and linear expansion coefficient of the particles will be explained.

A cylinder that has the same composition as the particles in the solder and has two substantially parallel surfaces facing each other is prepared. The Young's modulus, Poisson's ratio, and linear expansion coefficient of the cylinder is measured by a known method. The measured Young's modulus, Poisson's ratio, and linear expansion coefficient of the cylinder can be regarded as the Young's modulus, Poisson's ratio, and linear expansion coefficient of the particles in the solder.

The composition of the Sn alloy phase may be any composition that is generally used as a composition of a Sn alloy of solder. Examples of compositions of lead-containing solder mentioned in JIS Z 3282:2017 include Sn—Pb-based, Sn—Pb—Bi-based, and Sn—Pb—Ag-based compositions. Examples of compositions of lead-free solder mentioned in JIS Z 3282:2017 include Sn—Sb-based, Sn—Cu-based, Sn—Cu—Ni-based, Sn—Ag—Cu—In-based, Sn—Ag-based, Sn—Cu—Ag—P—Ga-based, Sn—Ag—Cu-based, Sn—Ag—Cu—Ni—Ge-based, Sn—Bi—Cu—In-based, Sn—Ag—Cu-based, Sn—Cu—Ni—P—Ga-based, Sn—Ag—Bi—Cu-based, Sn—Bi—Ag—Cu—In-based, Sn—Bi—Ag—Cu-based, Sn—In—Ag—Bi-based, Sn—Zn-based, Sn—Zn—Bi-based, Bi—Sn-based, and Sn—In-based compositions. For example, the Sn alloy phase may have the Sn—Sb-based or Sn—Ag—Cu-based composition.

Preferably, in terms of environmental friendliness, the solder substantially does not contain Pb, which means that the amount of Pb is 0.10 mass % or less.

The particles may be of any kind. For example, the particles may contain at least one selected from the group consisting of C, N, and O, and may contain C. In other words, the particles may contain at least one compound selected from the group consisting of a carbide, a nitride, and an oxide, and may contain a carbide. When the particles contain the at least one compound, the particles readily have higher strength than when the particles are metal particles. This is because, when the particles are metal particles, they may react with the Sn alloy to generate an intermetallic, readily lowering the strength of the solder. Because a carbide has a higher Young's modulus and a lower linear expansion coefficient than a nitride and an oxide, it is preferable that the particles particularly contain C or a carbide.

The particles may contain SiC, AlN, $Al_2O_3$, and/or $BaTiO_3$ and may contain SiC as a main component. For example, containing SiC as a main component means having SiC occupy 50 mass % or more of all particles.

The particles may occupy any proportion of the solder. The particles may occupy 6 vol % or more, 10 vol % or more, or 15 vol % or more. The particles may occupy 40 vol % or less or 35 vol % or less. The proportion of the particles in the solder may be measured by any method. For example, first, mass ratios of the constituents of the solder are measured. The mass ratios of the constituents of the solder can be measured by probing a cross section of the solder including the Sn alloy phase and the particles using an electron probe micro-analyzer (EPMA) or the like. From the density of the solder and the density of the particles, the proportion of the particles in the solder can be calculated in terms of volume ratio. Note that changing the proportion of the particles in the solder does not significantly change the melting point of the solder.

The particles in the solder may have any average size. For example, the average particle size may be 0.3 μm or more and 20 μm or less. The average size of the particles in the solder may be measured by any method. For example, first, an image of a cross section of the solder is taken with a scanning electron microscope or the like. The image of the cross section of the solder is taken at a magnification that allows equivalent circular diameters of the particles in the solder to be measured. The image is analyzed with image analysis software or the like to work out the equivalent circular diameters of the particles in the solder. By calculating the equivalent circular diameters of fifty or more particles and working out their average, the average size of the particles in the solder can be measured.

An electronic component according to the present embodiment may be of any type and may have any shape. For example, the electronic component may be a multilayer ceramic capacitor.

A multilayer ceramic capacitor generally includes an element body and a pair of external electrodes. The element body has a structure including dielectric layers and internal electrode layers alternately laminated along the lamination direction.

In the multilayer ceramic capacitor, by volume, the proportion of the dielectric is generally the largest. Thus, the linear expansion coefficient of the multilayer ceramic capacitor tends to be close to that of the dielectric. The main component of the most commonly used dielectric of the multilayer ceramic capacitor is $BaTiO_3$. The linear expansion coefficient of $BaTiO_3$ is 9.4 ppm/° C. Thus, the linear expansion coefficient of the multilayer ceramic capacitor tends to be a value close to 9.4 ppm/° C.

One method of mounting the multilayer ceramic capacitor on a substrate is to surface-mount the multilayer ceramic capacitor directly on the substrate. Another method is to join mounting terminal electrodes to the external electrodes of the multilayer ceramic capacitor and mount the multilayer ceramic capacitor having the mounting terminal electrodes on the substrate.

When the multilayer ceramic capacitor is surface-mounted on the substrate directly, the capacitor may be mounted through reflow soldering. When the mounting terminal electrodes are joined to the external electrodes of the multilayer ceramic capacitor, the external electrodes and the mounting terminal electrodes may be soldered. In either case, the above-mentioned solder can be used.

When the solder is used for joining the external electrodes and the mounting terminal electrodes, the external electrodes may be made from any material. For example, the external electrodes may be resin electrodes. The mounting terminal electrodes (metal terminals) may be made from any material. For example, the metal terminals may be made from a metal having Fe as a main component (e.g., stainless steel) or a metal having Cu as a main component (e.g., phosphor bronze). The solder may have any thickness. For example, the thickness of the solder may be 1 μm or more and 20 μm or less.

The solder according to the present embodiment may be manufactured by any method. For example, the solder can be manufactured by mixing Sn alloy solder balls with the particles.

First, the Sn alloy solder balls, a flux, and the particles are prepared and weighed to satisfy an intended composition. The Sn alloy solder balls, the flux, and the particles are then mixed to give a solder paste. By melting the solder paste, the solder according to the present embodiment can be manufactured. The flux may be any known flux.

EXAMPLES

Hereinafter, the present invention will be specifically explained based on examples.

Sn Alloy Properties

Solder balls made of a Sn alloy A and solder balls made of a Sn alloy B shown in Table 1 were prepared.

The Young's modulus, Poisson's ratio, linear expansion coefficient, and melting point of the respective Sn alloys A and B were measured. The solder balls made of the respective Sn alloys A and B were melted and then casted to produce cylindrical samples for measurement of the Young's modulus and Poisson's ratio and cylindrical samples for measurement of the linear expansion coefficient. The Young's modulus and Poisson's ratio were measured by an ultrasonic method. The linear expansion coefficient was measured with a thermomechanical analyzer (TMA). Table 1 shows the results. The melting point of the respective Sn alloys A and B was measured with a thermogravimetric/differential thermal analyzer (TG-DTA) using the solder balls made of the Sn alloy A and the solder balls made of the Sn alloy B. The melting point of the Sn alloy A was 245° C., and the melting point of the Sn alloy B was 217° C.

Glass Composite Substrate Properties

CEM-3 was prepared as a glass composite substrate. The linear expansion coefficient of the glass composite substrate was measured with a thermomechanical analyzer (TMA). Note that, in Example 2 (described later), the measurement direction of the linear expansion coefficient and the longitudinal direction of a multilayer ceramic capacitor were the same. Table 1 shows the results.

The Young's modulus of the glass composite substrate was measured by a tensile testing method. The Poisson's ratio of the glass composite substrate was calculated from values of a rectangular strain gauge attached at a center of the glass composite substrate for tensile testing. Table 1 shows the results.

Note that, in the compositions of the Sn alloys and the compositions of the metal terminals, the proportion of elements with no numerals is the substantial remainder.

TABLE 1

| Composition | Sn alloy A Sn—10Sb (wt %) | Sn alloy B Sn—3Ag—0.5Cu (wt %) | Particles A SiC (Atomic ratio) | Particles B AlN (Atomic ratio) | Particles C $Al_2O_3$ (Atomic ratio) | Particles D $BaTiO_3$ (Atomic ratio) | Metal terminals A Cu—8.0Sn—0.2P (wt %) | Metal terminals B Fe—18Cr—8Ni (wt %) | Glass composite substrate CEM-3 |
|---|---|---|---|---|---|---|---|---|---|
| Young's modulus (GPa) | 47.9 | 50.9 | 430 | 320 | 370 | 118 | 110 | 197 | 15 |
| Poisson's ratio | 0.39 | 0.35 | 0.16 | 0.27 | 0.24 | 0.32 | 0.34 | 0.34 | 0.30 |
| Linear expansion coefficient (ppm/° C.) | 21.2 | 21.7 | 3.1 | 4.6 | 6.3 | 9.4 | 18.2 | 17.2 | 20.0 |

Particle Properties

Particles A to D shown in Table 1 were prepared. The particles A to D had an average size of 3 μm.

The Young's modulus, Poisson's ratio, and linear expansion coefficient of the respective types of particles A to D were measured. First, cylinders (may simply be referred to as cylindrical samples) having the same composition as the respective types of particles and two substantially parallel surfaces facing each other were prepared.

Specifically, for each composition, a cylindrical sample for measurement of the Young's modulus and Poisson's ratio and a cylindrical sample for measurement of the linear expansion coefficient were prepared. Then, the Young's modulus, Poisson's ratio, and linear expansion coefficient were measured as those of the Sn alloys A and B were measured. Table 1 shows the results.

Metal Terminal Properties

Metal terminals A and B shown in Table 1 were prepared. The Young's modulus, Poisson's ratio, and linear expansion coefficient of the respective types of metal terminals A and B were measured. First, cylindrical samples for measurement of the Young's modulus and Poisson's ratio made of the same material as the respective types of metal terminals A and B and cylindrical samples for measurement of the linear expansion coefficient made of the same material as the respective types of metal terminals A and B were prepared. Then, the Young's modulus, Poisson's ratio, and linear expansion coefficient were measured as those of the Sn alloys A and B were measured. Table 1 shows the results. Note that the material of the metal terminals A was phosphor bronze (C5212), and the material of the metal terminals B was stainless steel (SUS304).

Experiment 1

Particles shown in Table 2 were added to a Sn alloy shown in Table 2 to manufacture solder according to each Sample as specifically explained below.

The particles A to D having compositions shown in Table 1 were prepared.

The Sn alloys A and B were manufactured and the particles A, B, C, and/or D were added thereto at the same time. Specifically, the solder balls made of the Sn alloy A and the solder balls made of the Sn alloy B having compositions shown in Table 1 were prepared. Then, the solder balls made of the Sn alloy A or B, a flux, and the particles A, B, C, and/or D were appropriately mixed to give a solder paste. The amount of the particles A, B, C, and/or D was determined so that the proportion of the particles in the solder when the solder paste was melted was as shown in Table 2. The flux was rosin. The amount of the flux was determined so that the proportion of the flux in the solder when the solder paste was melted was 5 mass %. Note that, in Sample No. 10, the particles A, B, and C had a volume ratio of 1:0.5:0.5.

The linear expansion coefficient of the solder according to each Sample was measured with a thermomechanical analyzer (TMA) as the linear expansion coefficients of the Sn alloys A and B were measured. Table 2 shows the results. The linear expansion coefficient of the solder was regarded as good at 20.0 ppm/° C. or less and better at 18.2 ppm/° C. or less.

The melting point of the solder according to each Sample was measured with a thermogravimetric/differential thermal analyzer (TG-DTA) as the melting points of the Sn alloys A and B were measured. It was confirmed that, in all Samples, the melting point did not change from the melting point of each Sn alloy shown in Table 1 as of when the particles were not added.

Next, a thermal shock test and a tensile strength test were conducted.

First, multilayer ceramic capacitors having a size of 5.7 mm×5.0 mm×2.0 mm and $BaTiO_3$ as the main component of the dielectric were prepared. Then, two metal terminals shown in Table 2 were fixed on resin electrodes (external electrodes) of each multilayer ceramic capacitor using the solder according to each Sample shown in Table 2.

The multilayer ceramic capacitor with the two fixed metal terminals was positioned on a ceramic plate to conduct the thermal shock test. In the thermal shock test, the temperature was −55° C. to 125° C., and the number of cycles was 200.

The multilayer ceramic capacitor subjected to the thermal shock test was subjected to the tensile strength test. The tensile strength test was conducted with a universal material testing machine. Specifically, different jigs were fixed to the two metal terminals fixed to the multilayer ceramic capacitor subjected to the thermal shock test, and the stress (tensile strength) at which rupture took place when the jigs were pulled was measured. Table 2 shows the results. A tensile strength of 29.0 N or more was regarded as good; a tensile strength of 30.0 N or more was regarded as better; and a tensile strength of 32.0 N or more was regarded as best.

According to Table 2, when the solder according to each example having a linear expansion coefficient reduced by adding predetermined particles to the Sn alloy was used, the tensile strength after the thermal shock test was high. The tensile strength after the thermal shock test was particularly high in Sample Nos. 4 to 12, in which the linear expansion coefficient of the solder was lower than that of the metal terminals. It is assumed that this was because the linear expansion coefficient of the solder according to Sample Nos. 4 to 12 was between the linear expansion coefficient of the dielectric of the multilayer ceramic capacitor and the linear expansion coefficient of the metal terminals, thus mitigating stress caused between the multilayer ceramic capacitor and the metal terminals at the time of thermal shock.

Experiment 2

Solder according to each Sample shown in Table 3 was manufactured as in Experiment 1.

Next, a thermal shock test and a bonding strength test were conducted.

First, multilayer ceramic capacitors having a size of 3.2 mm×1.6 mm×1.6 mm and $BaTiO_3$ as the main component of

TABLE 2

| Sample No. | Example/ Comparative example | Sn alloy | Young's modulus of Sn alloy (GPa) | Linear expansion coefficient of Sn alloy (ppm/° C.) | Particles | Young's modulus of particles (GPa) | Linear expansion coefficient of particles (ppm/° C.) | Proportion of particles (vol %) |
|---|---|---|---|---|---|---|---|---|
| 1 | Comparative example | A | 47.9 | 21.2 | | N/A | | 0 |
| 2 | Example | A | 47.9 | 21.2 | A | 430 | 3.1 | 6 |
| 3 | Example | A | 47.9 | 21.2 | A | 430 | 3.1 | 10 |
| 4 | Example | A | 47.9 | 21.2 | A | 430 | 3.1 | 15 |
| 5 | Example | A | 47.9 | 21.2 | A | 430 | 3.1 | 25 |
| 6 | Example | A | 47.9 | 21.2 | A | 430 | 3.1 | 35 |
| 5 | Example | A | 47.9 | 21.2 | A | 430 | 3.1 | 25 |
| 7 | Example | A | 47.9 | 21.2 | B | 320 | 4.6 | 25 |
| 8 | Example | A | 47.9 | 21.2 | C | 370 | 6.3 | 25 |
| 9 | Example | A | 47.9 | 21.2 | D | 118 | 9.4 | 25 |
| 10 | Example | A | 47.9 | 21.2 | A-0.5B-0.5C | 388 | 4.3 | 25 |
| 5 | Example | A | 47.9 | 21.2 | A | 430 | 3.1 | 25 |
| 11 | Example | A | 47.9 | 21.2 | A | 430 | 3.1 | 25 |
| 12 | Example | B | 50.9 | 21.7 | A | 430 | 3.1 | 25 |

| Sample No. | Metal terminals | Linear expansion coefficient of metal terminals (ppm/° C.) | Linear expansion coefficient of dielectric (ppm/° C.) | Linear expansion coefficient of solder (ppm/° C.) | Tensile strength after thermal shock test (N) |
|---|---|---|---|---|---|
| 1 | A | 18.2 | 9.4 | 21.2 | 27.2 |
| 2 | A | 18.2 | 9.4 | 19.9 | 29.8 |
| 3 | A | 18.2 | 9.4 | 19.1 | 30.5 |
| 4 | A | 18.2 | 9.4 | 18.1 | 32.1 |
| 5 | A | 18.2 | 9.4 | 16.1 | 32.7 |
| 6 | A | 18.2 | 9.4 | 14.1 | 32.6 |
| 5 | A | 18.2 | 9.4 | 16.1 | 32.7 |
| 7 | A | 18.2 | 9.4 | 16.5 | 32.6 |
| 8 | A | 18.2 | 9.4 | 16.9 | 32.1 |
| 9 | A | 18.2 | 9.4 | 18.1 | 30.2 |
| 10 | A | 18.2 | 9.4 | 16.4 | 32.8 |
| 5 | A | 18.2 | 9.4 | 16.1 | 32.7 |
| 11 | B | 17.2 | 9.4 | 16.1 | 32.1 |
| 12 | A | 18.2 | 9.4 | 16.1 | 32.1 |

the dielectric and substrates shown in Table 3 were prepared. Then, resin electrodes (external electrodes) of each multilayer ceramic capacitor were fixed on the corresponding substrate through reflow soldering using the solder according to each Sample shown in Table 3 to mount the multilayer ceramic capacitor thereon. Note that the measurement direction of the linear expansion coefficient of the substrate and the longitudinal direction of the multilayer ceramic capacitor were the same.

Next, the multilayer ceramic capacitor fixed and mounted on the substrate was subjected to the thermal shock test. In the thermal shock test, the temperature was −55° C. to 125° C., and the number of cycles was 200.

The multilayer ceramic capacitor subjected to the thermal shock test was subjected to the bonding strength test. The bonding strength test was conducted with a universal material testing machine. Specifically, a jig was pressed against a side surface of the multilayer ceramic capacitor mounted on the substrate to measure the stress (bonding strength) at which the capacitor detaches from the substrate. Table 3 shows the results. A bonding strength of 110 N or more was regarded as good.

TABLE 3

| Sample No. | Example/ Comparative example | Sn alloy | Young's modulus of Sn alloy (GPa) | Linear expansion coefficient of Sn alloy (ppm/° C.) | Particles | Young's modulus of particles (GPa) | Linear expansion coefficient of particles (ppm/° C.) | Proportion of particles (vol %) |
|---|---|---|---|---|---|---|---|---|
| 21 | Comparative example | B | 50.9 | 21.7 | | N/A | | 0 |
| 22 | Example | B | 50.9 | 21.7 | A | 430 | 3.1 | 25 |
| 23 | Example | B | 50.9 | 21.7 | B | 320 | 4.6 | 25 |
| 24 | Example | B | 50.9 | 21.7 | C | 370 | 6.3 | 25 |
| 25 | Example | A | 47.9 | 21.2 | A | 430 | 3.1 | 25 |

| Sample No. | Substrate | Linear expansion coefficient of substrate (ppm/° C.) | Linear expansion coefficient of dielectric (ppm/° C.) | Linear expansion coefficient of solder (ppm/° C.) | Bonding strength after thermal shock test (N) |
|---|---|---|---|---|---|
| 21 | CEM-3 | 20.0 | 9.4 | 21.7 | 98 |
| 22 | CEM-3 | 20.0 | 9.4 | 16.1 | 128 |
| 23 | CEM-3 | 20.0 | 9.4 | 16.5 | 124 |
| 24 | CEM-3 | 20.0 | 9.4 | 17.0 | 122 |
| 25 | CEM-3 | 20.0 | 9.4 | 16.1 | 129 |

According to Table 3, when the solder having a linear expansion coefficient reduced by adding predetermined particles to the Sn alloy was used, the bonding strength after the thermal shock test was high. It is assumed that this was because the linear expansion coefficient of the solder according to each example was between the linear expansion coefficient of the dielectric of the multilayer ceramic capacitor and the linear expansion coefficient of the substrate, thus mitigating stress caused between the multilayer ceramic capacitor and the substrate at the time of thermal shock.

What is claimed is:

1. A solder comprising:

a Sn alloy phase; and particles, wherein the particles have a higher Young's modulus than the Sn alloy phase;

the particles have a lower linear expansion coefficient than the Sn alloy phase;

the particles comprise SiC, AlN, $Al_2O_3$, and/or $BaTiO_3$ as a main component, the particles occupy 15 vol % or more and 35 vol % or less; and an average size of the particles is 3 μm or more and 20 μm or less.

2. The solder according to claim 1, wherein the particles comprise SiC as a main component.

3. The solder according to claim 2, wherein the particles have a linear expansion coefficient of 10 ppm/° C. or less, the particles have a Young's modulus of 60 GPa or more, and the solder has a linear expansion coefficient of 14.1 ppm/° C. or more and 19.9 ppm/° C. or less.

4. The solder according to claim 1, wherein the particles have a linear expansion coefficient of 10 ppm/° C. or less.

5. The solder according to claim 1, wherein the particles have a Young's modulus of 60 GPa or more.

6. The solder according to claim 1, wherein the solder substantially does not comprise Pb.

7. The solder according to claim 1, wherein the solder has a linear expansion coefficient of 14.1 ppm/° C. or more and 19.9 ppm/° C. or less.

8. An electronic component comprising a metal terminal joined thereto with the solder according to claim 1.

* * * * *